(12) United States Patent
Shenoy et al.

(10) Patent No.: US 8,533,796 B1
(45) Date of Patent: Sep. 10, 2013

(54) PROVIDING APPLICATION PROGRAMS WITH ACCESS TO SECURED RESOURCES

(75) Inventors: Vittaldas Sachin Shenoy, Calicut (IN); Pankaj Risbood, Bangalore (IN); Vivek Sahasranaman, Bangalore (IN); Christoph Kern, Bainbridge Island, WA (US); Evan K. Anderson, Seattle, WA (US)

(73) Assignee: Google Inc., Mountain View, CA (US)

( * ) Notice: Subject to any disclaimer, the term of this patent is extended or adjusted under 35 U.S.C. 154(b) by 316 days.

(21) Appl. No.: 13/094,385

(22) Filed: Apr. 26, 2011

Related U.S. Application Data

(60) Provisional application No. 61/453,414, filed on Mar. 16, 2011.

(51) Int. Cl.
*G06F 7/04* (2006.01)

(52) U.S. Cl.
USPC ............. 726/6; 726/5; 726/7; 726/9; 726/10; 726/26; 713/156; 713/158; 713/172; 713/173; 713/174; 380/229; 705/65; 705/66; 705/67; 709/225

(58) Field of Classification Search
USPC ............... 726/1–26; 713/156–158, 172–174; 380/229; 705/65–69
See application file for complete search history.

(56) References Cited

U.S. PATENT DOCUMENTS

| | | | |
|---|---|---|---|
| 5,463,768 A | 10/1995 | Cuddihy et al. | |
| 6,598,179 B1 | 7/2003 | Chirashnya et al. | |
| 7,043,455 B1* | 5/2006 | Cuomo et al. | 705/75 |
| 7,062,718 B2 | 6/2006 | Kodosky et al. | |
| 7,117,243 B2 | 10/2006 | Peart | |
| 7,500,262 B1* | 3/2009 | Sanin et al. | 726/2 |
| 7,650,331 B1 | 1/2010 | Dean et al. | |
| 7,653,833 B1 | 1/2010 | Miller et al. | |
| 7,761,573 B2 | 7/2010 | Travostino et al. | |
| 7,804,862 B1 | 9/2010 | Olson et al. | |
| 8,065,717 B2* | 11/2011 | Band | 726/9 |
| 8,108,903 B2* | 1/2012 | Norefors et al. | 726/2 |
| 8,146,147 B2 | 3/2012 | Litvin et al. | |
| 2004/0139368 A1 | 7/2004 | Austen et al. | |
| 2005/0166011 A1 | 7/2005 | Burnett et al. | |

(Continued)

OTHER PUBLICATIONS

U.S. Appl. No. 13/010,548, Andrew Kadatch et al., Storing Data on Storage Nodes, filed Jan. 20, 2011.

(Continued)

*Primary Examiner* — Yin-Chen Shaw
*Assistant Examiner* — Fahimeh Mohammadi
(74) *Attorney, Agent, or Firm* — Fish & Richardson P.C.

(57) ABSTRACT

In general, the subject matter described in this specification can be embodied in methods, systems, and program products for providing access to secured resources. A token providing system stores a primary authentication token that is used to obtain temporary authentication tokens. The token providing system provides, to application programs that are unable to access the primary authentication token, the temporary authentication tokens. The token providing system receives, from a first application program of the application programs, a first request to obtain a first temporary authentication token. The first request does not include the primary authentication token. The token providing system transmits a second request to obtain the first temporary authentication token. The second request includes the primary authentication token. The token providing system receives the first temporary authentication token. The token providing system provides the first temporary authentication token for use by the first application program.

18 Claims, 6 Drawing Sheets

(56) References Cited

U.S. PATENT DOCUMENTS

| | | | |
|---|---|---|---|
| 2006/0161753 | A1 | 7/2006 | Aschoff et al. |
| 2007/0199058 | A1 | 8/2007 | Baumgart et al. |
| 2007/0271604 | A1 | 11/2007 | Webster et al. |
| 2007/0280243 | A1 | 12/2007 | Wray et al. |
| 2008/0086515 | A1 | 4/2008 | Bai et al. |
| 2008/0205415 | A1 | 8/2008 | Morales |
| 2008/0215796 | A1 | 9/2008 | Lam et al. |
| 2009/0097657 | A1 | 4/2009 | Scheidt et al. |
| 2009/0199177 | A1 | 8/2009 | Edwards et al. |
| 2009/0222815 | A1 | 9/2009 | Dake |
| 2009/0241108 | A1 | 9/2009 | Edwards et al. |
| 2009/0249440 | A1 | 10/2009 | Platt et al. |
| 2009/0300605 | A1 | 12/2009 | Edwards et al. |
| 2010/0017859 | A1* | 1/2010 | Kelly et al. ............ 726/5 |
| 2010/0057913 | A1 | 3/2010 | DeHaan |
| 2010/0071035 | A1 | 3/2010 | Budko et al. |
| 2010/0199089 | A1 | 8/2010 | Vysogorets et al. |
| 2010/0212004 | A1* | 8/2010 | Fu ............................. 726/9 |
| 2020/0287548 | | 11/2010 | Zhou et al. |
| 2011/0022812 | A1 | 1/2011 | van der Linden et al. |
| 2011/0153838 | A1 | 6/2011 | Belkine et al. |
| 2011/0231280 | A1 | 9/2011 | Farah |
| 2011/0258441 | A1 | 10/2011 | Ashok et al. |
| 2012/0233678 | A1* | 9/2012 | Pal ............................ 726/7 |
| 2012/0233705 | A1* | 9/2012 | Boysen et al. ............ 726/29 |

OTHER PUBLICATIONS

U.S. Appl. No. 13/243,752, Kadatch, et al., Bandwidth Throttling of Virtual Disks, filed Sep. 23, 2011.

U.S. Appl. No. 13/287,813, Beda et al., Virtual Network Pairs, filed Nov. 2, 2011.

U.S. Appl. No. 13/186,293, Anderson et al., Virtual Network for Virtual Machine Communication and Migration, filed Jul. 19, 2011.

U.S. Appl. No. 13/245,545, Anderson et al., Virtual Network for Virtual Machine Communication and Migration, Sep. 26, 2011.

U.S. Appl. No. 13/247,830, Risbood, et al., High-Level Language for Specifying Configurations of Cloud-Based Deployments, filed Sep. 28, 2011.

U.S. Appl. No. 13/027,872, Rahul S. Kulkarni et al., Correlating Status Information Generated in a Computer Network, filed Feb. 15, 2011.

U.S. Appl. No. 13/153,971, Pankaj Risbood, et al., Automated Software Updating Based on Prior Activity, filed Jun. 6, 2011.

U.S. Appl. No. 13/295,897, Beda et al., Adjustable Virtual Network, filed Nov. 14, 2011.

U.S. Appl. No. 13/312,872, Anderson, Transparent Load-Balancing for Cloud Computing Services, filed Dec. 6, 2011.

U.S. Appl. No. 13/344,450, Beda et al., Managed Boot in a Cloud System, filed Jan. 5, 2012.

U.S. Appl. No. 13/346,547, Thornton et al., Processor Mode Locking, filed Jan. 9, 2012.

U.S. Appl. No. 13/349,063, Anderson, Network Address Translation for Virtual Machines, filed Jan. 12, 2012.

U.S. Appl. No. 13/348,548, Beda et al., Virtual Network Pairs, filed Jan. 11, 2012.

U.S. Appl. No. 13/350,398, Anderson, Network Addres Translation for Virtual Machines, filed Jan. 12, 2012.

U.S. Appl. No. 13/350,470, Petrescu-Prahova et al., Virtual Network Protocol, filed Jan. 13, 2012.

U.S. Appl. No. 13/356,365, Kern et al., Distributed Key Systems for Virtual Machines, filed Jan. 23, 2012.

U.S. Appl. No. 13/361,876, Beda et al., Advertising Auction System, filed Jan. 30, 2012.

U.S. Appl. No. 13/398,715, Berreth et al., Secure Inter-Process Communication, filed Feb. 17, 2012.

U.S. Appl. No. 13/402,975, Beda et al., Virtual Machine Service Access, filed Feb. 23, 2012.

U.S. Appl. No. 13/421,124, Risbood et al., Selection of Ranked Configurations, filed Mar. 15, 2012.

U.S. Appl. No. 13/418,951, Risbood et al., Virtual Machine Name Resolution, filed Mar. 13, 2012.

U.S. Appl. No. 13/422,575, Sahasranaman, Monitoring and Automatically Managing Applications, filed Mar. 16, 2012.

U.S. Appl. No. 13/424,013, Beda, Exposing Data to Virtual Machines, filed Mar. 19, 2012.

U.S. Appl. No. 13/439,256, Beda, Distribution of Cryptographic Host Keys in a Cloud Computing Environment, filed Apr. 4, 2012.

Moller, Jan, et al., "Internal Network Security", Feb. 1, 2000-May 18, 2001, Retrieved from the Internet: <URL: http://www.daimi.au.dk/~fwiffo/thesis/>, 183 pages.

Primet, Pascale, et al.., "HIPCAL: State of the Art of OS and Network virtualization solutions for Grids", Sep. 14, 2007, 38 pages.

Abdull, AlastairIrvine, et al. "Generic Routing Encapsulation", [online] [retrieved on Jan.4, 2011]. Retrieved from the Internet: <URL: http://creativecommons.org/licenses/by-sa/3.0/>, 5 pages.

Farinacci et al., "RFC 2784: Generic Routing Encapsulation (GRE)", Mar. 2000, The Internet Society, 10 pages.

Kent et al., "RFC 4301: Security Architecture for the Internet Protocol", Dec. 2005, The Internet Society, 102 pages.

Wikipedia, "Domain Name System" [online]; Feb. 4, 2012; [Retrieved on Feb. 4, 2012]. Retrieved from the Internet: <URL: http://en.wikipedia.org/wiki/Domain_Name_System>, 16 pages.

Bucket Explorer. "What is my AWS Access and Secret Key." [Retrieved Apr. 26, 2011]. Retrieved from the Internet <URL: http://www.bucketexplorer.com/documentation/amazon-s3--what-is-my-aws-access-and-secret-key.html>, 1 page.

Hongkiat. "Amazon S3—The Beginner's Guide." [Retrieved on Apr. 26, 2011]. Retrieved from the Internet <URL: http://www.hongkiat.com/blog/amazon-s3-the-beginners-guide/>, 9 pages.

Myerson, Judith. "Creating Applications with Amazon EC2 and S3." O'ReillyOnLamp.com, May 13, 2008 [Retrieved on Apr. 26, 2011]. Retrieved from the Internet <URL: http://onlamp.com/pub/a/onlamp/2008/05/13/creating-applications-with-amazon-ec2-and-s3.html>, 8 pages.

Wikipedia. "OAuth." [online], Dec. 12, 2010; [Retrieved on Jan. 20, 2011] Retrieved from the Internet <URL: http://en.wikipedia.org/wiki/OAuth>; 3 pages.

Gowalla. "API Documentation—Oauth." [Retrieved on Apr. 26, 2011]. Retrieved from the Internet <URL: http://gowalla.com/api/docs/oauth>, 4 pages.

Apache HTTP Server Version 2.0. "Log Files." [Retrieved on Feb. 15, 2011]. Retrieved from the Internet <URL: http://httpd.apache.org/docs/2.0/logs.html>, 7 pages.

Microsoft Support. "How to view and manage event logs in Event Viewer in Windows XP." May 7, 2007, version 3.5 [Retrieved on Feb. 15, 2011]. Retrieved from the Internet <URL: http://support.microsoft.com/kb/308427>, 6 pages.

MSDN. "Visual Basic Concepts, Visual Studio 6.0: Centralized Error Handling." [Retrieved on Feb. 15, 2011]. Retrieved from the Internet <URL: http://msdn.microsoft.com/en-us/library/aa240795(d=printer, v=vs.60).aspx>, 4 pages.

Laitinen, Aapo et al., Network Address Translation [Retrieved on Oct. 10, 2011] Retrieved from the Internet: <URL: http://en.wikipedia.org/wiki/Networkpages_Address_and_Port_Translation>, 11 pages.

Wikipedia., Anycast [Retrieved on Oct. 10, 2011] Retrieved from the Internet: URL <http://en.wikipedia.org/wiki/Anycast>, 5 pages.

VMCI Overview [Retrieved on Jun. 8, 2011] Retrieved from the Internet: <URL: http://pubs.vmware.com/vmci-sdk/VMCI_intro.html>, 3 pages.

VMware vSphere [Retrieved on Jun. 8, 2011] Retrieved from the Internet: <URL: http://www.vmware.com/products/vmotion/overview.html>, 2 pages.

Travostino, Franco, et al., Seamless Live Migration of Virtual Machines over the MAN/WAN, 2006, Elsevier Future Generation Computer Systems 2006, 10 pages.

VMCI Datagram API [Retrieved on Jun. 8, 2011], Retrieved from the Internet: <URL: http://pubs.vmware.com/vmci-sdk/datagram.html>, 1 page.

VMCI Datagram_SendTo [Retrieved on Jun. 8, 2011], Retrieved from the Internet: <URL: http://pubs.vmware.com/vmci-sdk/functions/VMCIDatagram_SendTo.html>, 1 page.

VMCIDs_Lookup [Retrieved on Jun. 8, 2011], Retrieved from the Internet: <URL: http://pubs.vmware.com/vmci-sdk/functions/VMCIDs_Lookup.html>, 2 pages.
Chen, Per M., et al., : "Maximizing Performance in a Striped Disk Array", 17th Annual International Symposium on Computer Architecture (SIGARCH 1990), 18 pages.
Sarhan, Nabil J., et al., "Caching and Scheduling in NAD-Based Multimedia Servers"; IEEE Computer Society, IEEE Transactions on Parallel and Distributed Systems, vol. 15, No. 10, Oct. 2004; pp. 921-933.
Vazhkudai, Sudharshan S., et al.; "Constructing Collaborative Desktop Storage Caches for Large Scientific Datasets"; ACM Journal Name, vol. V, No. N, Jun. 2006, 34 pages.
OMG, Deployment and Configuration of Component-based Distributed Applications Specification—Version 4.0, OMG, 2006, pp. 1-160.
Cala et al., "Automatic Software Deployment in the Azure Cloud", IFIP International Federation for Information Processing, 2010, pp. 1-14.
RSA Laboratories, "PKCS #11 v2.20: Cryptographic Token Interface Standard," Jun. 28, 2004, RSA Security Inc. (407 pages).
Amazon Auto Scaling-Getting Started Guide-API Version Aug. 1, 2010. Amazon Web Services LLC, 2010, 20 pages.
Amazon Auto Scaling- Developer Guide- API Version Aug. 1, 2010. Amazon Web Services LLC, 2011, 62 pages.
Amazon CloudWatch-Developer Guide-API Version Aug. 1, 2010. Amazon Web Services LLC, 2010, 75 pages.
Benincosa. "Ganglia and Nagios, Part 2: Monitor enterprise clusters with Nagios-Install Nagios to effectively monitor a data center; make Ganglia and Nagios work together," 2009, 20 pages.
'Nagios' [online]. "Monitoring Linux/Unix Machines," 2011, [retrieved on Feb. 3, 2011]. Retrieved from the Internet: URL: <http://nagios.sourceforge.net/docs/3_0/monitoring-linux.html > 1 page.
'Nagios' [online]. "Nagios Plugins," 2011, [retrieved on Feb. 3, 2011]. Retrieved from the Internet: URL: <http://nagios.sourceforge.net/docs/3_0/plugins.html > 2 pages.
'Zabbix' [online]. "Zabbix 1.8: The Ultimate Open Source Monitoring Solution," 2001-2012, [retrieved on Feb. 3, 2011]. Retrieved from the Internet: URL: <http://www.zabbix.com/features.php.> 1 page.
Amazon Elastic Compute Cloud, User Guide, API Version Mar. 1, 2012, pp. 97-103, downloaded from http://docs.amazonwebservices.com/AWSEC2/latest/UserGuide/AESDG-chapter-instancedata.html?r=4276 on Mar. 18, 2012.
Paravirtualization, Wikipedia Article, downloaded from http://en.wikipedia.org/wiki/Paravirtualization on Mar. 18, 2012.
Paravirtualized File Systems, Eric Van Hensbergen, downloaded from http://www.slideshare.net/ericvh/9p-on-kvm on Mar. 18, 2012.
"IPsec". Creativecommons.org [online]. Creative Commons Attribution-Share Alike 3.0 Unported, Nov. 11, 2010; [Retrieved on Jan. 14, 2011] Retrieved from the Internet: <URL: http://en.wikipedia.org/w/index.php?oldid=396193389>; pp. 1-8.
"Generic Routing Encapsulation". Creativecommons.org [online]. Creative Commons Attribution-Share Alike 3.0 Unported, Nov. 12, 2010; [Retrieved on Jan. 14, 2011]; Retrieved from the Internet: <URL: http//en.wikipedia.org/w/index.php?oldid=396280384>; pp. 1-5.
Cloud Computing Course, Part 2: Amazon's EC2, Marcel Gagne, Jun. 13, 2011. Retrieved from the Internet: <URL: http://marcelgagne.com/content/cloud-computing-course-part-2-amazons-ec2>, 6 pages.
How to: Getting Started With Amazon EC2, Paul Stamatiou, Apr. 5, 2008. Retrieved from the Internet: <URL:http//paulstamatiou.com/how-to-getting-started-with-amazon-ec2>, 25 pages.
Uploading Personal ssh Keys to Amazon EC2, Eric Hammond, Oct. 14, 2010. Retrieved from the Internet: <URL:http://alestic.com/2010/10/ec2-ssh-keys>, 3 pages.
Key Management in Cloud Datacenters, Security Stackexchange.com, Retrieved from the Internet on Nov. 18, 2011; Retrieved from: <URL: http://security.stackexchange.com/questions/2514/key-management-in-cloud-datacenters>, 2 pages.
Managing Amazon EC2—SSH Login and Protecting Your Instances, Everyday's Findings, Monday, May 18, 2009, Retrieved from the Internet on Nov. 18, 2011; Retrieved from: <URL: http://blog.tag-gesell.de/index.php?/aarchives/73-Managing-Amazon-EC2., 6 pages.
Using and Managing AWS—Part 6: SSH Key Pairs, Top WordPress, May 26, 2009, Retrieved from the Internet: <URL: http://clouddb.info/2009/05/26/using-and-managing-aws-part-6-ssh-key-pairs>, 5 pages.
Live Migration of Virtual Machines, Clark et al., University of Cambridge Laboratory, Department of Computer Science; University of Copenhagen, Denmark, 2005; 14 pages.
Making Services Easy to Migrate, Debian Administration, System Administration Tips and Resources, Jan. 1, 2005, 5 pages.
L. Gommans, et al., Token-Based Authorization of Connection Oriented Network Resources, 1st International Workshop on Networks for Grid Applications (GridNets 2004), Oct. 29, 2004; 8 pages.
Bucket Explorer. "What is my AWS Access and Secret Key." [Retrieved Apr. 26, 2011]. Retrieved from the Internet <URL: http://www.bucketexplorer.com/documentation/amazon-s3--what-is-my-aws-access-and-secret-key,hmtl> (1 page).
Gowalla. "API Documentation—Oauth." [Retrieved on Apr. 26, 2011]. Retrieved from the Internet <URL: http://gowall.com/api/docs/oauth> (4 pages).
Hongkiat. "Amazon S3—The Beginner's Guide." [Retrieved on Apr. 26, 2011]. Retrieved from the Internet <URL: http://www.hongkiat.com/biog/amazon-s3-the-beginners-guide/> (9 pages).
Mverson, Judith. "Creating Applications with Amazon EC2 and S3." O'ReillyOnLamp.com, May 13, 2008 [Retrieved on Apr. 26, 2011]. Retrieved from the Internet <URL: , http://onlamp.com/pub/a/onlamp//2008/05/13//creating-applications-with-amazon-ec2-and-s3,html> (8 pages).
Wikipedia. "OAuth." [Retrieved on Jan. 20, 2011]. Retrieved from the Internet <URL: http://en.wikipedia.org/wiki/OAuth> (3 pages).

* cited by examiner

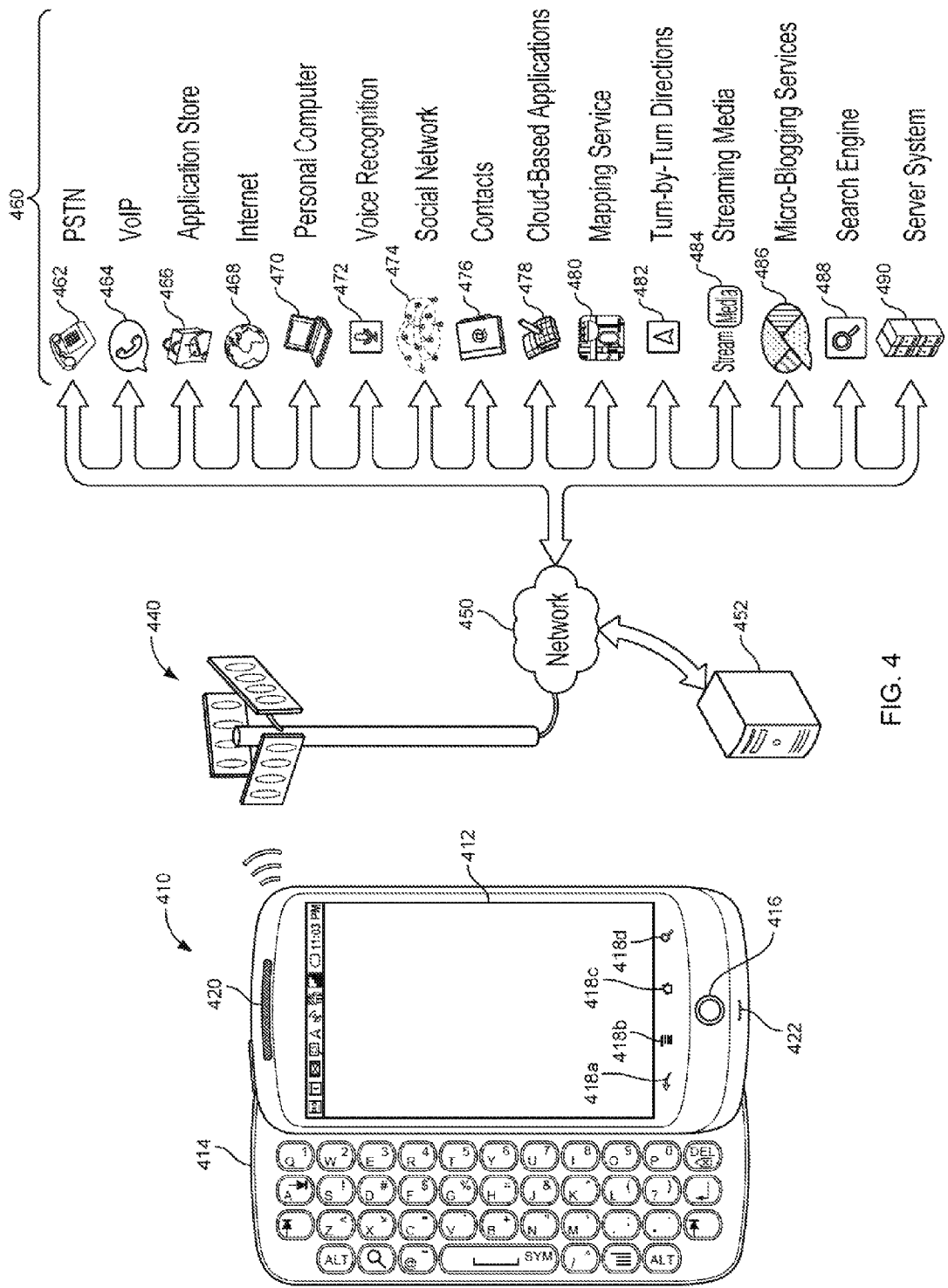

US 8,533,796 B1

PROVIDING APPLICATION PROGRAMS WITH ACCESS TO SECURED RESOURCES

CROSS-REFERENCE TO RELATED APPLICATION

This application claims priority to U.S. Provisional Application Ser. No. 61/453,414, filed on Mar. 16, 2011, entitled "Providing Application Programs with Access to Secured Resources," the entire contents of which are hereby incorporated by reference.

TECHNICAL FIELD

This document generally relates to securing resources on a network.

BACKGROUND

In large-scale computing environments, multiple applications may be executing simultaneously for different users on various server computers, and multiple applications may share a single computer by each using a virtual machine that is distinct from other virtual machines on the computer. Such applications can also access resources or services from other server computers in the large-scale computer system. For example, a user may be running an application for managing various forms of content, and the application may need to access copies of the user's content that are stored and managed by a separate sub-system in the overall system.

In such situation, the services may require that the application program provide authentication credentials (e.g., a username and a password) in order to use the services. The authentication credentials may be accessible to the application program or the virtual machine in order to allow the application program or virtual machine to use the authentication credentials to access the services. In another example, a derivative of the authentication credentials that provides access to a limited scope of the services for an unlimited amount of time may be accessible to the application program or virtual machine. However, if the virtual machine is compromised by a malicious user, the malicious user may obtain the user credentials or the derivative of the user credentials, and thus may be able to access the services for an unlimited amount of time.

SUMMARY

This document describes techniques, methods, systems, and mechanisms for providing application programs with access to secured resources of a service provider. The application programs may receive access to the secured resources through the use of temporary authorization tokens. The temporary authorization tokens may be provided to the application programs by a token providing system at a computing system that hosts the application programs. The token providing system may receive the temporary authorization tokens from an authentication system at the service provider in response to the token providing system providing the authentication system a primary authentication token for a user account. The primary authentication token may be stored at the token providing system. The primary authentication token may be obtained by a user providing user credentials for the user account to the authentication system or a service provider that is in communication with the authentication system.

In general, one aspect of the subject matter described in this specification can be embodied in a computer-implemented method for providing access to secured resources. The method includes storing, by a token providing system at a computer, a primary authentication token that an authentication system of a service provider generated in response to receiving authentication credentials for a user account, wherein the primary authentication token can be used to obtain multiple temporary authentication tokens that can be used to access secured resources that the service provider stores in association with the user account, and wherein the token providing system does not have access to the authentication credentials. The method includes receiving, by the token providing system and from a first application program of multiple application programs, a first request to obtain a first temporary authentication token for use in accessing a first portion of the secured resources, wherein the first application program does not have access to the authentication credentials and the first request does not include the primary authentication token. The method includes transmitting, by the token providing system and to the authentication system, a second request to obtain the first temporary authentication token, wherein the second request includes the primary authentication token that was stored by the token providing system. The method includes receiving, by the token providing system and from the authentication system, the first temporary authentication token. The method includes providing, by the token providing system and to the first application program, the first temporary authentication token for use by the first application program in accessing the first portion of the secured resources.

Another aspect of the subject matter described in this specification can be embodied in a computer-implemented method for providing access to secured resources. The method includes storing, by a token providing system at a computer system, a primary authentication token that is used to obtain temporary authentication tokens from an authentication system of a service provider, wherein the token providing system provides, to application programs that are unable to access the primary authentication token, the temporary authentication tokens for use in accessing portions of secured resources of the service provider. The method includes receiving, by the token providing system and from a first application program of the application programs, a first request to obtain a first temporary authentication token for use in accessing a first portion of the secured resources, wherein the first request does not include the primary authentication token. The method includes transmitting, by the token providing system and to the authentication system at the service provider, a second request to obtain the first temporary authentication token, wherein the second request includes the primary authentication token. The method includes receiving, by the token providing system and from the authentication system, the first temporary authentication token. The method includes providing, by the token providing system and to the first application program, the first temporary authentication token for use by the first application program in accessing the first portion of the secured resources.

These and other implementations can optionally include one or more of the following features. The authentication system may have generated the primary authentication token in response a user providing authentication credentials for a user account, wherein the primary authentication token can be used to obtain secured resources of the service provider that are associated with the user account. The primary authentication token may not be used to access secured resources of the service provider that cannot be accessed using the authentication credentials. The authentication credentials may include a username and a shared secret that are associated with the user account. The token providing system may not have access to authentication credentials that are associated with the primary authentication token. The first application program may not have access to the authentication credentials. The authentication credentials may be for a user account at the service provider. The first temporary authentication token may be for use in accessing a portion of resources that are associated with the user account at the service provider.

The first request may include a first requested scope that is for use in identifying the first portion of the secured resources. The second request may include the first requested scope. The first temporary authentication token may provide the first application program access, based on the first requested scope, to the first portion of the secured resources in distinction to other portions of the secured resources. The method may include receiving, by the token providing system and from a second application program of the application programs, a third request to obtain a second temporary authentication token for use in accessing a second portion of the secured resources, wherein the third request includes a second requested scope that is for use in identifying the second portion of the secured resources and does not include the primary authentication token. The method may include transmitting, by the token providing system and to the authentication system, a fourth request to obtain the second temporary authentication token, the fourth request including the primary authentication token and the second requested scope. The method may include receiving, by the token providing system and from the authentication system, the second temporary authentication token. The method may include providing, by the token providing system and to the second application program, the second temporary authentication token for use by the second application program in accessing the second portion of the secured resources, wherein the first portion of the secured resources is different than the second portion of the secured resources.

The first temporary authentication token can be used, for accessing the first portion of the secured resources, for a limited time duration. The limited time duration may be shorter than a time duration during which the authentication system provides temporary authentication tokens to the token providing system in response to the token providing system providing, to the authentication system, requests that include the primary authentication token. The primary authentication token may not be used to retrieve secured resources from the service provider without obtaining one or more temporary authentication tokens using the primary authentication token.

Other aspects of the subject matter described in this specification can be embodied in one or more computer-readable storage devices storing instructions that, when executed by one or more processing devices, perform operations according to the above-described methods.

Another aspect of the subject matter described in this specification can be embodied in a computer system for providing access to secured resources. The system includes application programs that are hosted by a computer system for third-party users that are provided an ability to administer the application programs upon providing valid user credentials. The system includes a primary token, at the computer system, that an authentication system of a service provider generated in response to the service provider receiving user credentials that are associated with a user account, the service provider storing resources in association with the user account. The system includes a temporary token requester, at the computer system. The temporary token requester is to receive requests from the application programs for at least portions of the resources that are stored in association with the user account. The temporary token requester is to request, using the primary authentication token, temporary authentication tokens from the authentication system. The temporary token requester is to provide the temporary authentication tokens to the application programs for use in accessing at least portions of the resources.

This and other implementations can optionally include the following features. A first subset of the application programs may be stored by a first virtual machine that the computer system hosts for a first third-party user of the third-party users. A second subset of the application programs may be stored by a second virtual machine that the computer system hosts for a second third-party user of the third-party users. The requests from the application programs may each identify a scope of the respective request. The system may include a scope authorizer, at the computer system, to determine whether the scopes received in the requests from the application programs are valid for permissions provided to the application programs. The computer system may not store the user credentials. None of the application programs may store the user credentials and none of the application programs may store the primary authentication token. The system may include the authentication system.

Particular embodiments can be implemented, in certain instances, to realize one or more of the following advantages. Application programs and virtual machines may be able to access services and resources that are associated with a user account of a service provider even though the application programs and virtual machines do not have access to the user credentials for the user account. Thus, if an application program or virtual machine is compromised by a malicious user, the malicious user cannot obtain full access to the services and resources that are associated with the user account. Indeed, even if the malicious user obtains access to the token providing system that redeems temporary tokens on behalf of the application programs, the token providing system may not have a mechanism to request a new primary token of a different scope. Such an approach may directly benefit both the user and the system or systems that provide services to the user.

Furthermore, each of the application programs can receive different temporary authentication tokens with different scopes of authorization so that, if one of the application programs is compromised, only the scope of services or resources associated with the access token of the compromised application program is available to the malicious user. The temporary authentication tokens may be valid for a limited duration so that a temporary authentication token that is obtained by a malicious user provides access for a limited time duration (e.g., less than a minute). Also, application programs may receive new temporary authentication tokens without providing user credentials.

The details of one or more embodiments are set forth in the accompanying drawings and the description below. Other features, objects, and advantages will be apparent from the description and drawings, and from the claims.

DESCRIPTION OF DRAWINGS

FIG. 4 is a conceptual diagram of a system that may be used to implement the systems and methods described in this document.

Like reference symbols in the various drawings indicate like elements.

DETAILED DESCRIPTION

Figure 1:
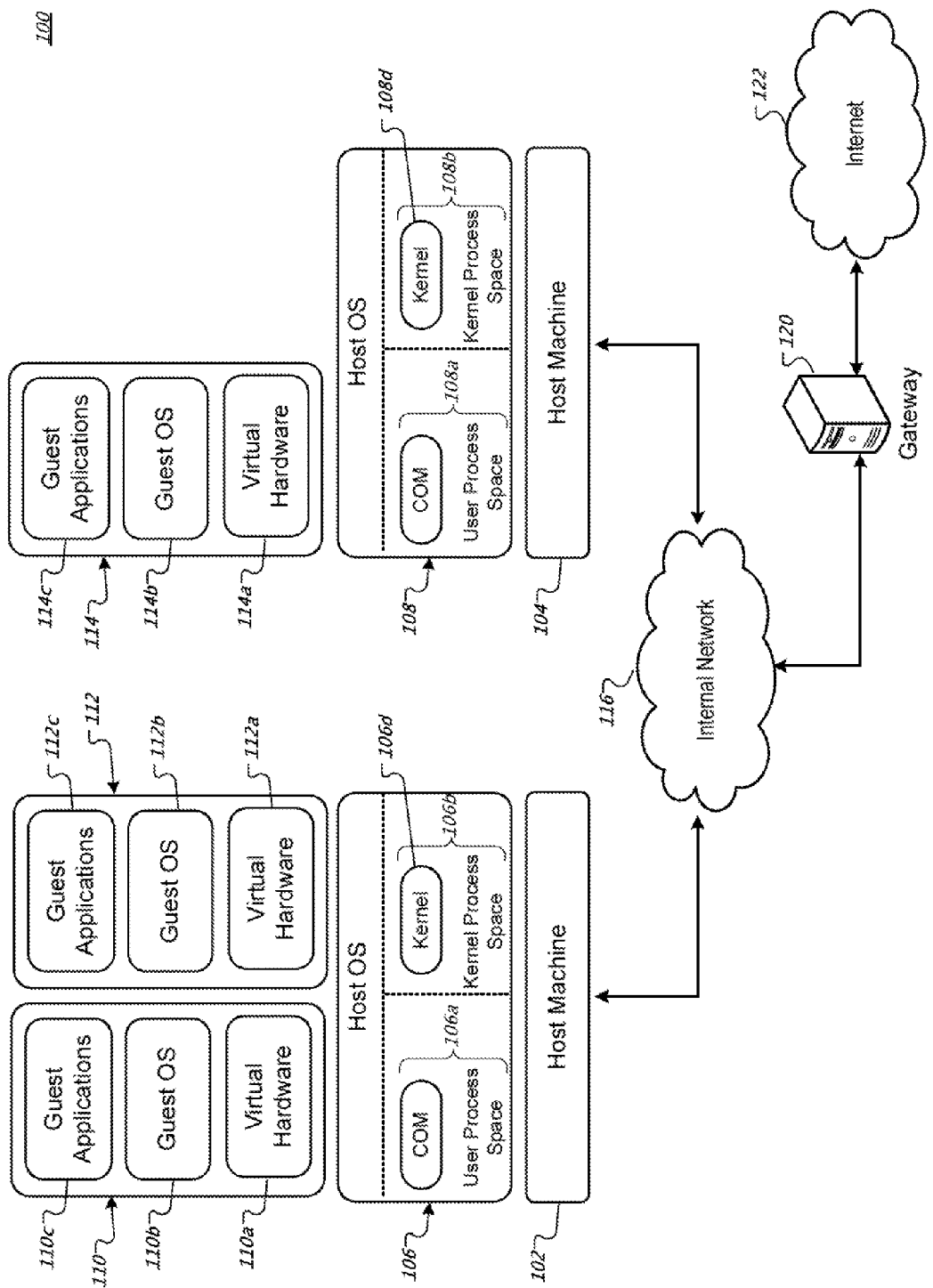
FIG. 1 is a schematic illustration of an example system that hosts virtual machines.

This document generally describes providing application programs with access to secured resources. In general, a computer system may provide an environment for hosting virtual machines that are used by third-party users. Each third-party user (e.g., an individual at a personal computer) may supply user credentials to access a configuration user interface of the third-party's user account for: (i) reserving particular virtual machines, (ii) installing operating systems on the virtual machines, and (iii) loading application programs onto the installed operating systems. The application programs may be accessed by users of the Internet without authentication. Thus, the computer system may operate many different virtual machines that are reserved by many different third-party users, and each of the virtual machines may execute multiple application programs, with each computer being capable of implementing multiple virtual machines at once.

The computer system may include a virtual machine container. The virtual machine container may include the hardware and software that provides the environment for execution of the virtual machines, and that provides other operations that support the virtual machines and the application programs operating therein. The virtual machine container may include a token providing system that provides the virtual machines with temporary authentication tokens for accessing services or resources of one or more service providers. The token providing system may be a computer program executing on at least one computer server programmed to provide tokens in the manner discussed herein.

The services and resources of a service provider may be secured so that the services and resources cannot be accessed by other computers or processes without the use of authentication credentials for a user account of the service provider (or authentications tokens that are redeemed using the authentication credentials, as discussed herein). In some examples, the developer or administrator of the virtual machine container may have such authorization credentials, but third-party users of the virtual machines may not have such authorization credentials.

Accordingly, the token providing system provides the application programs, which may be computer programs executing on at least one computer server, with an ability to access the services and resources through the use of temporary authentication tokens. The token providing system may obtain the temporary authentication tokens on behalf of the application programs. For example, an administrator of the virtual machine container may communicate, to a service provider system, the administrator's credentials for a user account of the service provider. The service provider system may determine if the credentials are valid. If so, the service provider system may provide to the authentication system, which may be a computer program executing on at least one computer server that is programmed to provide a primary authentication token (e.g., an OAuth 2.0 "refresh" token), an indication that the user supplied valid user credentials. The authentication system may return a primary authentication token to the service provider system. The service provider system may create a new token providing system, and may store the primary authentication token for access and use by the token providing system.

The primary authentication token may be stored by the token providing system (e.g., stored in memory that is accessible to the token providing system), and the token providing system may use the primary authentication token to provide application programs with access to services or resources that are within the scope of the administrator's user account (or a subset of the resources that are within a scope of the third-party user's user account with the virtual machine container). As such, the token providing system may use the OAuth (Open Authorization) standard to obtain authentication tokens that allow access to secured services and resources (e.g., files, pictures, and Application Program Interfaces (APIs)).

In some examples, the primary authentication token may not be used to directly access secured services or resources of a service provider. Instead, the token providing system may use the primary authentication token to request, from the authentication system, temporary authentication tokens (e.g., OAuth 2.0 "access" tokens). The request for temporary authentication tokens may include an indication of a scope that designates a requested range of services or resources. In response to the request, the authentication system may return a temporary authentication token that can be used to access a portion of the secured services or resources.

The scope of services or resources that is associated with a temporary authentication token may be a subset of the scope of services or resources that is associated with a primary authentication token. Further, the time duration during which a temporary authentication token may be used to obtain services or resources may be less than a time duration during which a primary authentication token can be used to redeem temporary authentication tokens. In some examples, the primary authentication token is perpetually valid for redeeming temporary authentication tokens (though it can be actively cancelled by a user of the authentication system, such as if a breach of the token is discovered or if the user wants to update the token with new credentialing information), but a temporary authentication token may be valid for twenty seconds, five minutes, an hour, a day, or another predefined period that will expire without the need for active intervention by the system.

The application programs that are running on the virtual machines may not be able to access the authentication credentials. The application programs may also not be able to access the primary authentication token. Indeed, the virtual machine container may not provide the credentials or primary authentication token to the application programs or virtual machines.

If the credentials or primary authentication token were available to the application programs or virtual machines, a malicious user may be able to obtain the credentials or primary authentication token if the malicious user gains access to the virtual machine. Loss of the credentials may permit the malicious user full access to the user account of the virtual machine administrator. Loss of the primary authentication token may provide the malicious user perpetual access to at least a portion of the services and resources that are available to the user account of the virtual machine administrator. For this reason, the token providing system may store a primary authentication token, but may not include a mechanism to request a new primary authentication token. Indeed, the primary authentication token may be designated for use by the token providing system upon creation of the token providing system. The system may include multiple different token providing systems for different sets of one or more virtual machines.

Accordingly, because the application programs may be prevented from accessing the credentials and the primary authentication token, the token providing system acts to redeem temporary authentication tokens on behalf of the application programs. An application program that is operating within the virtual machine container may request, from the token providing system, temporary access to services or resources of the service provider. The request may include an indication of a scope, where the indication of the scope specifies the services and resources that the application program would like to access.

The token providing system may receive the request, determine if the requesting application program is permitted to access the services and resources specified by the indication of the scope, and if so, may submit a request, to the authentication system at the service provider, for a temporary authentication token of the requested scope. The request to the authentication system may include the primary authentication token and the indication of the scope.

The authentication system may receive the request from the token providing system, determine if the primary authentication token is valid for a user account, and determine if the scope is permissible for the user account. If so, the authentication system generates a temporary authentication token and transmits the temporary authentication token to the token providing system. The token providing system receives the temporary authentication token and provides the temporary authentication token to the requesting application program.

The requesting application program may store the temporary authentication token and may include the temporary authentication token in requests for services and resources that are provided by the service provider. If the request is for resources that do not fall within a scope of the temporary authentication token, or if the temporary authentication has expired or is invalid, then the service provider may not return the requested resources. Otherwise, the service provider may return the requested resources or provide access to the requested service (e.g., access to a requested API). Each application programs may request a new temporary authentication token when the stored temporary authentication token expires (or is about to expire).

In some examples, the token providing system provides each application program temporary authentication tokens for multiple different service providers. Accordingly, the token providing system may include multiple different primary authentication tokens, and may request the temporary authentication tokens from multiple different authentication services at multiple different service providers.

In some examples, the token providing system has an ability to assert that a request to the token providing system for a temporary authentication token was transmitted by an application program that is hosted by the virtual machine container. The token providing system may not provide temporary authentication tokens to application programs that are not hosted by the virtual machine container.

FIG. 1 is a schematic illustration of an example system that hosts virtual machines. The system 100 includes one or more host machines such as, for example, host machine 102 and host machine 104. Generally speaking, a host machine is one or more data processing apparatuses, such as a rack mounted servers or other computing devices. The data processing apparatuses can be in different physical locations and can have different capabilities and computer architectures. Host machines can communicate with each other through an internal data communications network 116. The internal network can include one or more wired (e.g., Ethernet) or wireless (e.g., WI-FI) networks, for example. In some implementations the internal network 116 is an intranet. Host machines can also communicate with devices on external networks, such as the Internet 122, through one or more gateways 120 which are data processing apparatuses that are responsible for routing data communication traffic between the internal network 116 and the external network 122. Other types of external networks are possible.

Each host machine executes a host operating system or other software that virtualizes the underlying host machine hardware and manages concurrent execution of one or more virtual machines. For example, the host operating system 106 is managing virtual machine (VM) 110 and VM 112, while host OS 108 is managing a single VM 114. Thus, each VM may be part of a system VM or a process VM. Each VM includes a simulated version of the underlying host machine hardware, or a different computer architecture. The simulated version of the hardware is referred to as virtual hardware (e.g., virtual hardware 110a, 112a and 114a). Software that is executed by the virtual hardware is referred to as guest software. In some implementations, guest software cannot determine if it is being executed by virtual hardware or by a physical host machine. If guest software executing in a VM, or the VM itself, malfunctions or aborts, other VMs executing on the host machine will not be affected. A host machine's microprocessor(s) can include processor-level mechanisms to enable virtual hardware to execute software applications efficiently by allowing guest software instructions to be executed directly on the host machine's microprocessor without requiring code-rewriting, recompilation, or instruction emulation.

Each VM (e.g., VMs 110, 112 and 114) is allocated a set of virtual memory pages from the virtual memory of the underlying host operating system and is allocated virtual disk blocks from one or more virtual disk drives for use by the guest software executing on the VM. For example, host operating system 106 allocates memory pages and disk blocks to VM 110 and VM 112, and host operating system 108 does the same for VM 114. In some implementations, a given VM cannot access the virtual memory pages assigned to other VMs. For example, VM 110 cannot access memory pages that have been assigned to VM 112.

A virtual disk drive can be persisted across VM restarts. For example, virtual disk blocks can be allocated on physical disk drives coupled to host machines or available over the internal network 116. In addition to virtual memory and disk resources, VMs can be allocated network addresses through which their respective guest software can communicate with other processes reachable through the internal network 116 or the Internet 122. For example, guest software executing on VM 110 can communicate with guest software executing on VM 112 or VM 114. In some implementations, each VM is allocated one or more unique Internet Protocol (IP) version 4 or version 6 addresses and one or more User Datagram Protocol (UDP) port numbers. Other address schemes are possible.

A VM's guest software can include a guest operating system (e.g., guest operating systems 110b, 112b and 114b) which is software that controls the execution of respective guest software applications (e.g., guest applications 110c, 112c and 114c), within the VM and provides services to those applications. For example, a guest operating system could be a variation of the UNIX operating system. Other operating systems are possible. Each VM can execute the same guest operating system or different guest operating systems. In further implementations, a VM does not require a guest operating system in order to execute guest software applications. A guest operating system's access to resources such as networks and virtual disk storage may be controlled by the underlying host operating system.

By way of illustration, and with reference to virtual machine 110, when the guest application 110c or guest operating system 110b attempts to perform an input/output operation on a virtual disk, initiate network communication, or perform a privileged operation, for example, the virtual hardware 110a is interrupted so that the host operating system 106 can perform the action on behalf of the virtual machine 110. The host operating system 106 can perform these actions with a process that executes in kernel process space 106b, user process space 106a, or both.

The kernel process space 106b is virtual memory reserved for the host operating system 106's kernel 106d which can include kernel extensions and device drivers, for instance. The kernel process space has elevated privileges (sometimes referred to as "supervisor mode"); that is, the kernel 106d can perform certain privileged operations that are off limits to processes running in the user process space 106a. Examples of privileged operations include access to different address spaces, access to special functional processor units in the host machine such as memory management units, and so on. The user process space 106a is a separate portion of virtual memory reserved for user mode processes. User mode processes cannot perform privileged operations directly.

Figure 2:
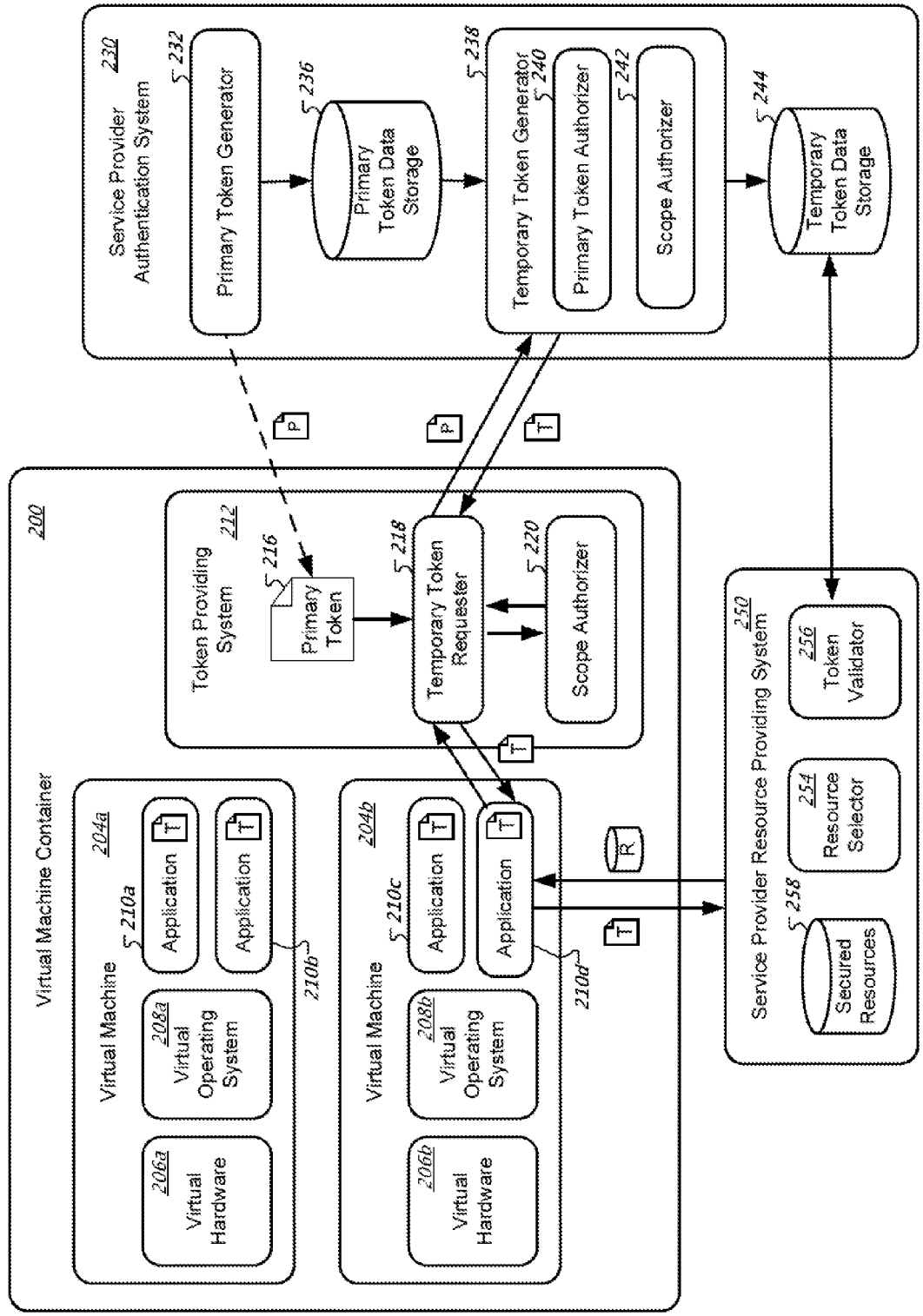
FIG. 2 is a schematic illustration of an example system that provides application programs with access to secured resources.

FIG. 2 is a schematic illustration of an example system that provides application programs with access to secured resources. The system includes a virtual machine container 200 that includes multiple virtual machines 204a-b that each execute multiple application programs 210a-d. The virtual machine container 200 also includes a token providing system 212. The token providing system 212 provides, to the application programs 210a-d, temporary authentication tokens that can be used by the application programs 210a-d in accessing content that is stored at the service provider resource providing system 250 (which may be a computer program executing on at least one computer server). The token providing system 212 obtains the temporary authentication tokens from the service provider authentication system 230. The token providing system may be implemented as a computer program within the host operating system 106 or as a stand-alone application program at the virtual machine container 200.

In greater detail, the virtual machine container 200 provides a computing environment that hosts the virtual machines 204a-b. In some examples, the virtual machine container 200 conceptually represents a combination of a host machine and host operating system (e.g., host machine 102 and host operating system 106). The virtual machine container 200 includes virtual machines 204a and 204b (e.g., virtual machines 110 and 112), which each include virtual hardware 206a and 206b (e.g., virtual hardware 110a and 112a), virtual operating systems 208a and 208b (e.g., guest operating systems 110b and 112b), and applications 210a-b and 210c-d (e.g., guest applications 110c and 112c). As described throughout this document, the applications 210a-d may be administered by third-party users that reserve the use of the virtual machines 204a-b from a business entity that hosts the virtual machine container 200.

The token providing system 212 provides a mechanism for the applications 210a-d to access secured resources 258 without the applications 210a-d supplying a username and password for a user account. The application programs access the secured resources 258 using temporary authentication tokens (designated in FIG. 2 by file icons labeled with a "T") that are provided to the application programs by the token providing system 212. The temporary authentication tokens are provided to the token providing system 212 by the service provider authentication system 230 in response to the token providing system 212 sending to the authentication system 230 a request that includes a primary authentication token (designated in FIG. 2 by a file icon with a label "P").

The primary authentication token 216 may be provided to the token providing system 212 at start up of the token providing system 212, and the scope of the primary authentication token 216 may represent a capability that was provided to the token providing system 212 and the virtual machines that it services. The primary authentication token 216 may be generated by the primary token generator 232 upon a user providing user credentials to the service provider.

Figure 3A:
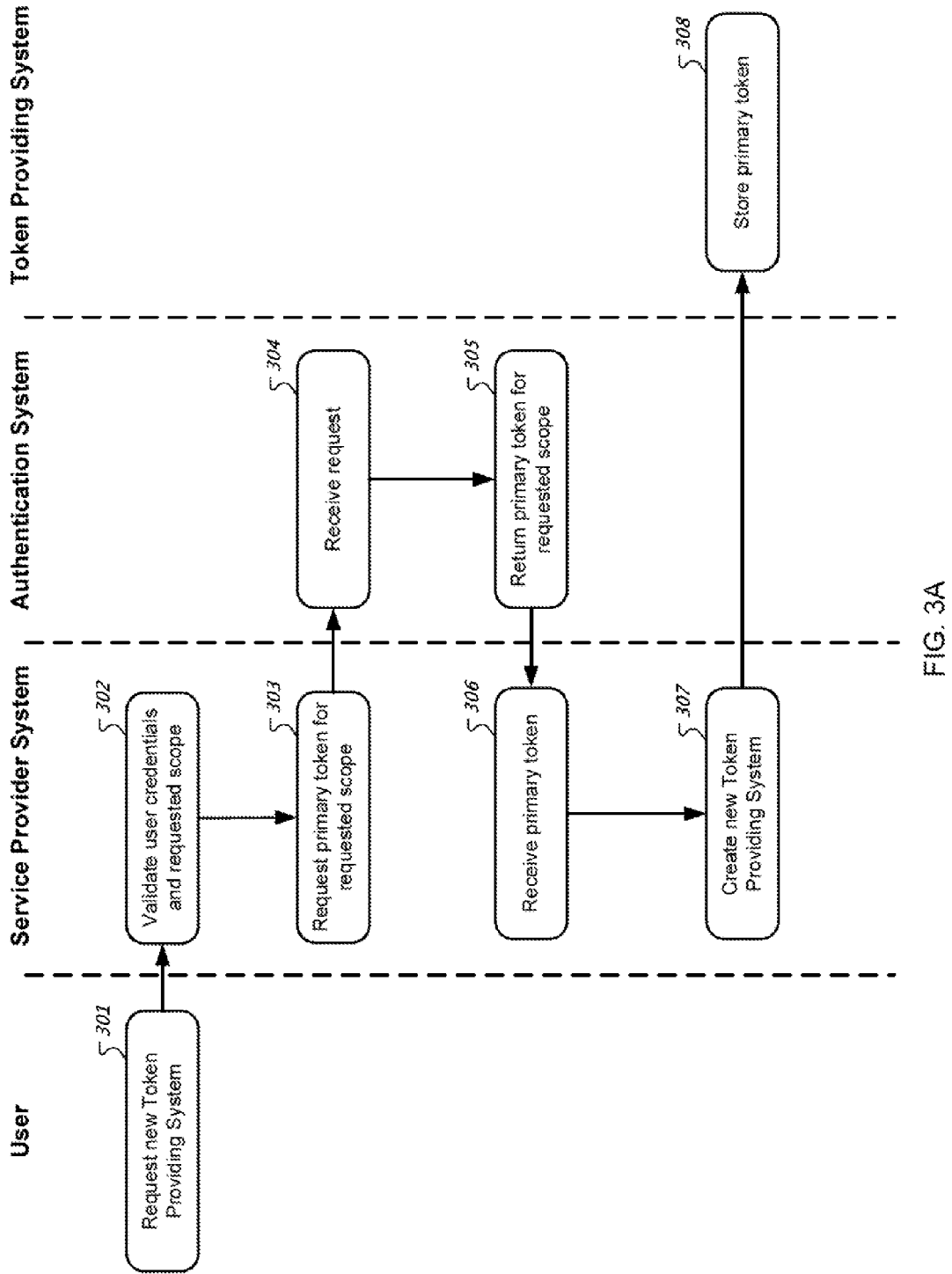
FIGS. 3A-B are flowcharts of an example process for providing application programs with access to secured resources.
Figure 3B:
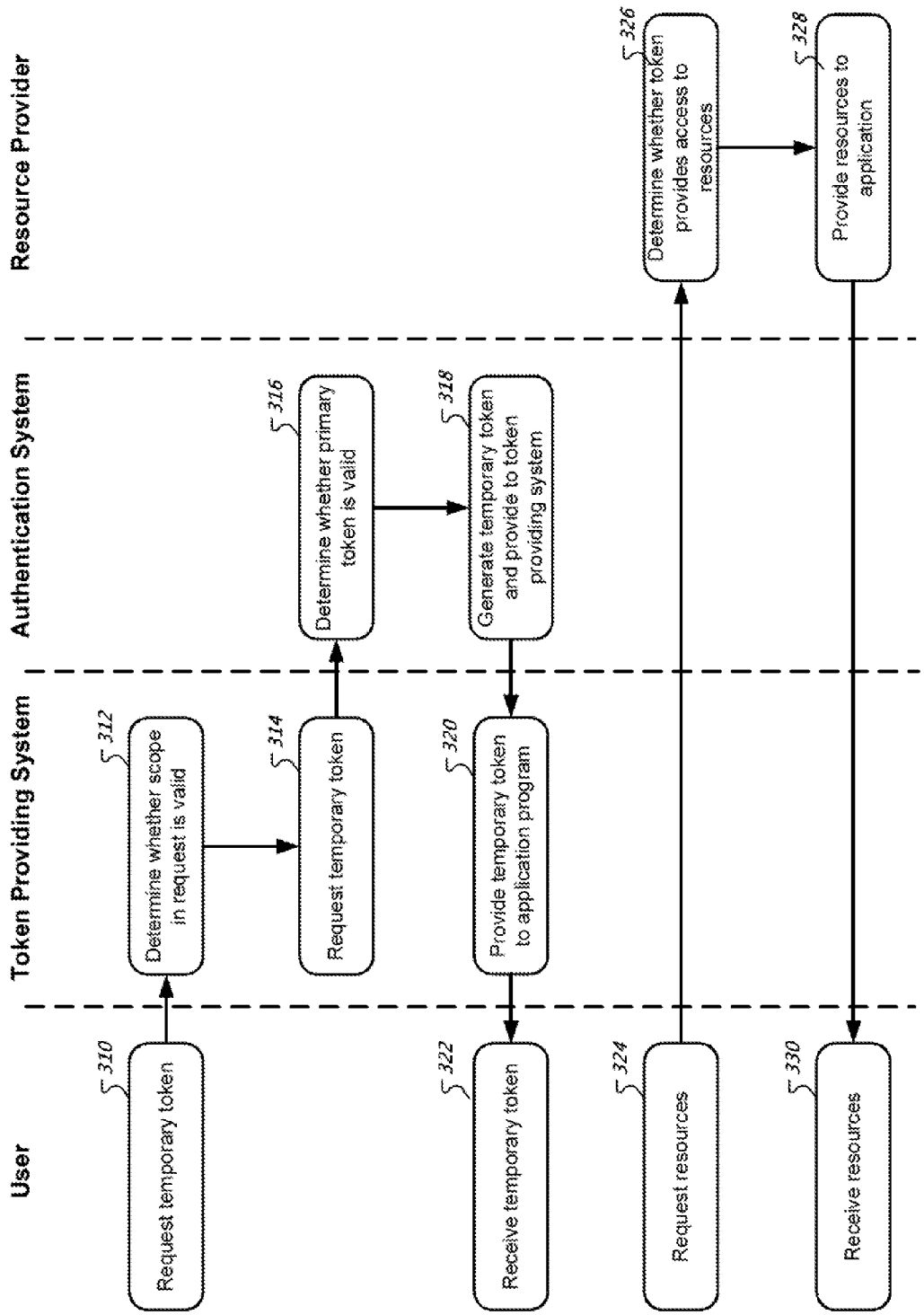

This process for obtaining primary authentication tokens and temporary authentication tokens is discussed below with respect to the schematic illustration of FIG. 2 and the swim-lane diagrams of FIGS. 3A-B. As an illustration, the administrator (or developer) of the token providing system 212 may have a user account with the service provider that allows the administrator to use services (e.g., APIs) of, or obtain resources (e.g., files) from, the service provider resource providing system 250. The administrator may be prompted to supply credentials for the user account in requests for the services or resources.

The administrator may desire to create an instance of a token providing system 212 for use by one or more virtual machines 204a-b (which may be created after creation of the token providing system 212). The administrator may desire to provide application programs 210a-d, which are, or are to be, loaded onto the virtual machines 204a-b by third-party users, with access to at least a portion of the services and resources. The administrator, however, may not want to provide his user credentials to the third-party users. The ability to provide the application programs 210a-d with such access to the services and resources, without the use of user credentials, is provided through the use of primary and temporary authentication tokens.

In box 301, the administrator may request to create a new token providing system. The request may include the user providing his user credentials and a scope that is to be associated with the new token providing system. The user credentials and the scope may be transmitted to the service provider system. User credentials may include a username that designates the administrator's user account with the service provider in distinction to multiple user accounts for the service provider, and a password. For example, the service provider system may provide resources to the user's computer for displaying a login web page. The user may provide his user credentials using the web page, for receipt and validation by the service provider system.

In box 302, the service provider system receives a request to create a new token providing system 212. The service provider system validates that the user credentials are valid, for example, by determining whether a received username matches a username in a database of usernames for the service provider, and whether a received password matches the password that is stored for the received username. The service provider system may also validate that a requested scope that is included in the request is valid for the user account (e.g., that the user is not requesting that the new token providing system 212 have access to resources that are unauthorized for the user account).

In box 303, in response to the service provider system validating the user credentials, the service provider system requests a primary token from the authentication system 230. The primary token generator 232 may receive, from the service provider system, a request to generate a primary token that provides access to the requested scope (box 304).

In box 305, the primary token generator 232 at the authentication system 230 generates a primary authentication token 216 and returns the primary authentication token 216 to the service provider system. The primary authentication token 216 may be a string of alphanumeric characters that is associated with the user account of the received credentials, and that may be not be publicly known as associated with the user account. In other words, the primary authentication token 216 may not be known as associated with the user account by entities other than the service provider and the token providing system 212. The authentication system 230 may store the primary authentication token 216, in the primary token data storage 236, in association with an identifier for the user account. Thus, the authentication system 230 can determine which account the primary authentication token is associated with, should the authentication system 230 later receive the primary authentication token in a request from the token providing system 212. The service provider system receives the primary authentication token from the authentication system 230 (box 306).

In box 307, the service provider system creates a new token providing system 212, and provides the token providing system 212 access to the primary token 216 (box 308).

In box 308, the token providing system 212 stores the primary authentication token 216 in computer memory that is accessible to the token providing system 212 (e.g., the token providing system 212 is provided a location at which the primary authentication token 216 is stored by the virtual machine container 200). The primary authentication token 216 may not be accessible to the virtual machines 204a-b or the applications 210a-d.

In some examples, a computer system may not use the primary authentication token 216 in a request for a secured services and resources that are associated with the user account. Rather, the token providing system 212 may need to "exchange" or "redeem" the primary authentication token 216 for one or more temporary authentication tokens which the computer system can use in requests for the secured services and resources.

In some examples, the primary authentication token 216 is associated with a scope of services and resources that is a subset of a scope of services and resources that is associated with the authentication credentials. For example, the administrator may be able to access APIs using his authentication credentials that the administrator is unable to access using temporary authentication tokens that were generated based on the primary authentication token.

In box 310, an application program (e.g., application program 210d) requests a temporary authentication token from the token providing system 212. The token providing system 212 may include an HTTP server that can receive requests from the application programs 210a-d, and can process the requests. An example request may include:

GET fetch_token HTTP/1.1
Account: user_account@domain.com
X-API-Scope: queue.api In this request, the application program 210d is requesting access to the API service "queue" for the user account "user_accout@domain.com."

In box 312, the scope authorizer 220 determines whether the scope in the request from the application program 210d is valid. For example, the token providing system 212 may limit the services and resources that particular virtual machines (or user accounts) can access. As an illustration, a first third-party user that maintains a first application program may be authorized to access the APIs "queue.api," "newsfeed.api," and "updates.api," while a second third-party user may be authorized to access "newsfeed.api" and "emailinterface.api." Such per-user-account permissions may be stored by the token providing system 212. Referencing the above example request, the scope authorizer 220 may determine if the user "user_account@domain.com" is authorized to access the service "queue.api." If not, the HTTP server at the token providing system 212 responds to the application program that the authorization is not present (e.g., with an "HTTP/1.1 403 Forbidden" response).

In box 314, if authorization to access the requested services and resources is provided, the temporary token requester 218 requests a temporary authorization token from the authentication service 230. The request may not include the token providing system administrator's user credentials, but may include the primary authentication token 216 that is associated with the token providing system administrator's user credentials. In some examples, the request from the temporary token requester 218 to the authentication service 230 includes the scope that was included in the request from the application program 210d to the temporary token requester 218.

In box 316, the request is received by the authentication system 230 and the primary token authorizer 240 determines whether the primary authentication token 216 that was received in the request is valid. For example, the request to the authentication system 230 may identify a user account that is associated with the token, and the primary token authorizer 240 may access the primary token data storage 236 to determine whether the primary authentication token is valid for the designated user account. In some examples, the request does not include the user account and the primary token authorizer 240 is able to verify whether the primary authentication token 216 is valid for any of the service provider's user accounts.

As noted above, the request to the authentication service 230 may include a scope. The scope authorizer 242 may determine whether the scope is valid for the user account associated with the primary authentication token 216. In some examples, the scope may include a service or resource that is outside of the range of services or resources that are available to the associated user account. In some examples, the scope includes a service or a resource that is within the range of services and resources that are available to the associated user account, but that is outside of the range of services and resources that are available to the primary authentication token 216.

In examples where the scope in the request designates a service or resource beyond the scope of the primary authentication token 216, the authentication system 230 may either respond that access is forbidden or may return a temporary authentication token that provides access to only those of the requested services and resources that are authorized.

If the requested scope is valid for the primary authentication token 216, the temporary token generator 238 generates a temporary authentication token. A temporary authentication token may be a string of alphanumeric characters that is associated with a user account of the primary authentication token 216, and that may be not be publicly known as associated with the user account. The temporary authentication token may be associated with the scope that is received in the request. The temporary token generator 238 stores, in the temporary token data storage 244, the temporary authentication token, an indication of the associated user account, and an indication of the scope associated with the temporary authentication token.

In box 318, the authentication service 320 provides the temporary authentication token to the temporary token requester 218 at the token providing system 212.

In box 320, the temporary token requester 218 at the token providing system 212 provides the temporary authentication token to the requesting application program. For example, the HTTP server at the token providing system 212 may send a response to the application program 210d:

HTTP/1.1 200 OK
Content-Length: <length>
access_token=<temporary-authentication-token>

In box 322, the application program 210d receives the response. The application program 210d may extract the temporary authentication token from the response, and may store the temporary authentication token. In some examples, the stored temporary authentication token is not accessible to application programs on different virtual machines. In some examples, the stored temporary authentication token is not accessible to other application programs.

In some examples, at least some and potentially all of the responses, from the authentication system 230 to the token providing system 212, that include temporary authentication tokens, include a new primary authentication token. In these examples, the token providing system 212 may discard the previous primary authentication token 216 and replace it with the newly acquired primary authentication token. This new primary authentication token can then be used to obtain the next temporary authentication token. In some examples, the primary authentication token lasts perpetually or for multiple requests for temporary authentication tokens, and new primary authentication tokens are not received from the authentication system 230 with the temporary authentication tokens unless requested.

In box 324, the application program 210d requests resources from the resource providing system 250. The request includes the temporary authentication token that the application program 210d received from the token providing system 212. A first example request that includes a temporary authentication token of "abc12345" as a query parameter is:
  GET www.serviceprovider.com/services?temporary_token=abc12345
A second example request that includes the temporary authentication token as a header is:
  GET www.serviceprovider.com/services
  Authorization: temporary_token=abc12345

In box 326, the resource provider 250 receives the request for resources, the resource provider 250 extracts the temporary authentication token from the request, and the token validator 256 determines whether the scope that is associated with the temporary authentication token includes the requested service or resources. For example, the token validator 256 determines whether the resources associated with the uniform resource identifier (URI) www.serviceprovider.com/services can be accessed using the temporary authentication token "abc12345." More specifically, the token validator 256 may access the temporary token data storage 244 to determine whether the temporary authentication token is associated with a user account. If the temporary authentication token is valid for a user account, the token validator may further access the temporary token data storage 244 to determine if the services or resources that were requested fall within the scope of the temporary authentication token.

In box 328, if the requested resources fall within the scope of the temporary authentication token, the resource selector 254 fetches the requested resources from the resources data storage 258 and provides the resources to the application program 210d (e.g., in an HTTP response). If the request is for a service, the resource providing system 250 may provide access to the requested service (e.g., by forwarding a command to an API that is designated in the request).

In box 330, the application program 210d receives the resources from the resource providing system 250.

Referring now to FIG. 4, a conceptual diagram of a system that may be used to implement the systems and methods described in this document is illustrated. In the system, mobile computing device 410 can wirelessly communicate with base station 440, which can provide the mobile computing device wireless access to numerous hosted services 460 through a network 450.

In this illustration, the mobile computing device 410 is depicted as a handheld mobile telephone (e.g., a smartphone, or application telephone) that includes a touchscreen display device 412 for presenting content to a user of the mobile computing device 410 and receiving touch-based user inputs. Other visual, auditory, and tactile output components may also be provided (e.g., LED lights, a speaker for providing tonal, voice-generated, or recorded output, or vibrating mechanisms for tactile output), as may various different input components (e.g., keyboard 414, physical buttons, trackballs, accelerometers, gyroscopes, and magnetometers).

Example visual output mechanism in the form of display device 412 may take the form of a 3.7 or 4.3 inch LED or AMOLED display with resistive or capacitive touch capabilities, for displaying video, graphics, images, and text, and coordinating user touch inputs locationally with the displayed information so that user contact above a displayed item may be associated with the item by the device 410. The mobile computing device 410 may take alternative forms also, including as a laptop computer, a tablet or slate computer, a personal digital assistant, an embedded system (e.g., a car navigation system), a desktop personal computer, or a computerized workstation.

An example mechanism for receiving user-input includes keyboard 414, which may be a full qwerty keyboard or a traditional keypad that includes keys for the digits '0-9', '*', and '#.' The keyboard 414 receives input when a user physically contacts or depresses a keyboard key. User manipulation of a trackball 416 or interaction with a trackpad enables the user to supply directional and rate of rotation information to the mobile computing device 410 (e.g., to manipulate a position of a cursor on the display device 412).

The mobile computing device 410 may be able to determine a position of physical contact with the touchscreen display device 412 (e.g., a position of contact by a finger or a stylus). Using the touchscreen 412, various "virtual" input mechanisms may be produced, where a user interacts with a graphical user interface element depicted on the touchscreen 412 by contacting the graphical user interface element. An example of a "virtual" input mechanism is a "software keyboard," where a keyboard is displayed on the touchscreen and a user selects keys by pressing a region of the touchscreen 412 that corresponds to each key.

The mobile computing device 410 may include mechanical or touch sensitive buttons 418a-d. Additionally, the mobile computing device may include buttons for adjusting volume output by the one or more speakers 420, and a button for turning the mobile computing device on or off. A microphone 422 allows the mobile computing device 410 to convert audible sounds into an electrical signal that may be digitally encoded and stored in computer-readable memory, or transmitted to another computing device. The mobile computing device 410 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include the ANDROID mobile device platform; APPLE IPHONE/MAC OS X operating systems; MICROSOFT WINDOWS 7/WINDOWS MOBILE operating systems; SYMBIAN operating system; RIM BLACKBERRY operating system; PALM WEB operating system; a variety of UNIX-flavored operating systems; or a proprietary operating system for computerized devices. The operating system may provide a platform for the execution of application programs that facilitate interaction between the computing device and a user.

The mobile computing device 410 may present a graphical user interface with the touchscreen 412. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 404. User-selection of the button may invoke the pre-defined action.

In some examples, the operating system provides a "desktop" user interface that is displayed upon turning on the mobile computing device 410, activating the mobile computing device 410 from a sleep state, upon "unlocking" the mobile computing device 410, or upon receiving user-selection of the "home" button 418*c*. The desktop graphical interface may display several icons that, when selected with user-input, invoke corresponding application programs. An invoked application program may present a graphical interface that replaces the desktop graphical interface until the application program terminates or is hidden from view.

User-input may manipulate a sequence of mobile computing device 410 operations. For example, a single-action user input (e.g., a single tap of the touchscreen, swipe across the touchscreen, contact with a button, or combination of these at a same time) may invoke an operation that changes a display of the user interface. Without the user-input, the user interface may not have changed at a particular time. For example, a multi-touch user input with the touchscreen 412 may invoke a mapping application to "zoom-in" on a location, even though the mapping application may have by default zoomed-in after several seconds.

The desktop graphical interface can also display "widgets." A widget is one or more graphical interface elements that are associated with an application program that has been executed, and that display on the desktop content controlled by the executing application program. A widget's application program may start with the mobile telephone. Further, a widget may not take focus of the full display. Instead, a widget may only "own" a small portion of the desktop, displaying content and receiving touchscreen user-input within the portion of the desktop.

The mobile computing device 410 may include one or more location-identification mechanisms. A location-identification mechanism may include a collection of hardware and software that provides the operating system and application programs an estimate of the mobile telephone's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by "checking in" to a location).

The mobile computing device 410 may include other application modules and hardware. A call handling unit may receive an indication of an incoming telephone call and provide a user capabilities to answer the incoming telephone call. A media player may allow a user to listen to music or play movies that are stored in local memory of the mobile computing device 410. The mobile telephone 410 may include a digital camera sensor, and corresponding image and video capture and editing software. An internet browser may enable the user to view content from a web page by typing in an addresses corresponding to the web page or selecting a link to the web page.

The mobile computing device 410 may include an antenna to wirelessly communicate information with the base station 440. The base station 440 may be one of many base stations in a collection of base stations (e.g., a mobile telephone cellular network) that enables the mobile computing device 410 to maintain communication with a network 450 as the mobile computing device is geographically moved. The computing device 410 may alternatively or additionally communicate with the network 450 through a Wi-Fi router or a wired connection (e.g., Ethernet, USB, or FIREWIRE). The computing device 410 may also wirelessly communicate with other computing devices using BLUETOOTH protocols, or may employ an ad-hoc wireless network.

A service provider that operates the network of base stations may connect the mobile computing device 410 to the network 450 to enable communication between the mobile computing device 410 and other computerized devices that provide services 460. Although the services 460 may be provided over different networks (e.g., the service provider's internal network, the Public Switched Telephone Network, and the Internet), network 450 is illustrated as a single network. The service provider may operate a server system 452 that routes information packets and voice data between the mobile computing device 410 and computing devices associated with the services 460.

The network 450 may connect the mobile computing device 410 to the Public Switched Telephone Network (PSTN) 462 in order to establish voice or fax communication between the mobile computing device 410 and another computing device. For example, the service provider server system 452 may receive an indication from the PSTN 462 of an incoming call for the mobile computing device 410. Conversely, the mobile computing device 410 may send a communication to the service provider server system 452 initiating a telephone call with a telephone number that is associated with a device accessible through the PSTN 462.

The network 450 may connect the mobile computing device 410 with a Voice over Internet Protocol (VoIP) service 464 that routes voice communications over an IP network, as opposed to the PSTN. For example, a user of the mobile computing device 410 may invoke a VoIP application and initiate a call using the program. The service provider server system 452 may forward voice data from the call to a VoIP service, which may route the call over the internet to a corresponding computing device, potentially using the PSTN for a final leg of the connection.

An application store 466 may provide a user of the mobile computing device 410 the ability to browse a list of remotely stored application programs that the user may download over the network 450 and install on the mobile computing device 410. The application store 466 may serve as a repository of applications developed by third-party application developers. An application program that is installed on the mobile computing device 410 may be able to communicate over the network 450 with server systems that are designated for the application program. For example, a VoIP application program may be downloaded from the Application Store 466, enabling the user to communicate with the VoIP service 464.

The mobile computing device 410 may access content on the internet 468 through network 450. For example, a user of the mobile computing device 410 may invoke a web browser application that requests data from remote computing devices that are accessible at designated universal resource locations. In various examples, some of the services 460 are accessible over the internet.

The mobile computing device may communicate with a personal computer 470. For example, the personal computer 470 may be the home computer for a user of the mobile computing device 410. Thus, the user may be able to stream media from his personal computer 470. The user may also view the file structure of his personal computer 470, and transmit selected documents between the computerized devices.

A voice recognition service 472 may receive voice communication data recorded with the mobile computing device's microphone 422, and translate the voice communication into corresponding textual data. In some examples, the translated text is provided to a search engine as a web query, and responsive search engine search results are transmitted to the mobile computing device 410.

The mobile computing device 410 may communicate with a social network 474. The social network may include numerous members, some of which have agreed to be related as acquaintances. Application programs on the mobile computing device 410 may access the social network 474 to retrieve information based on the acquaintances of the user of the mobile computing device. For example, an "address book" application program may retrieve telephone numbers for the user's acquaintances. In various examples, content may be delivered to the mobile computing device 410 based on social network distances from the user to other members. For example, advertisement and news article content may be selected for the user based on a level of interaction with such content by members that are "close" to the user (e.g., members that are "friends" or "friends of friends").

The mobile computing device 410 may access a personal set of contacts 476 through network 450. Each contact may identify an individual and include information about that individual (e.g., a phone number, an email address, and a birthday). Because the set of contacts is hosted remotely to the mobile computing device 410, the user may access and maintain the contacts 476 across several devices as a common set of contacts.

The mobile computing device 410 may access cloud-based application programs 478. Cloud-computing provides application programs (e.g., a word processor or an email program) that are hosted remotely from the mobile computing device 410, and may be accessed by the device 410 using a web browser or a dedicated program. Example cloud-based application programs include GOOGLE DOCS word processor and spreadsheet service, GOOGLE GMAIL webmail service, and PICASA picture manager.

Mapping service 480 can provide the mobile computing device 410 with street maps, route planning information, and satellite images. An example mapping service is GOOGLE MAPS. The mapping service 480 may also receive queries and return location-specific results. For example, the mobile computing device 410 may send an estimated location of the mobile computing device and a user-entered query for "pizza places" to the mapping service 480. The mapping service 480 may return a street map with "markers" superimposed on the map that identify geographical locations of nearby "pizza places."

Turn-by-turn service 482 may provide the mobile computing device 410 with turn-by-turn directions to a user-supplied destination. For example, the turn-by-turn service 482 may stream to device 410 a street-level view of an estimated location of the device, along with data for providing audio commands and superimposing arrows that direct a user of the device 410 to the destination.

Various forms of streaming media 484 may be requested by the mobile computing device 410. For example, computing device 410 may request a stream for a pre-recorded video file, a live television program, or a live radio program. Example services that provide streaming media include YOUTUBE and PANDORA.

A micro-blogging service 486 may receive from the mobile computing device 410 a user-input post that does not identify recipients of the post. The micro-blogging service 486 may disseminate the post to other members of the micro-blogging service 486 that agreed to subscribe to the user.

A search engine 488 may receive user-entered textual or verbal queries from the mobile computing device 410, determine a set of internet-accessible documents that are responsive to the query, and provide to the device 410 information to display a list of search results for the responsive documents. In examples where a verbal query is received, the voice recognition service 472 may translate the received audio into a textual query that is sent to the search engine.

These and other services may be implemented in a server system 490. A server system may be a combination of hardware and software that provides a service or a set of services. For example, a set of physically separate and networked computerized devices may operate together as a logical server system unit to handle the operations necessary to offer a service to hundreds of individual computing devices.

In various implementations, operations that are performed "in response" to another operation (e.g., a determination or an identification) are not performed if the prior operation is unsuccessful (e.g., if the determination was not performed). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

Figure 5:
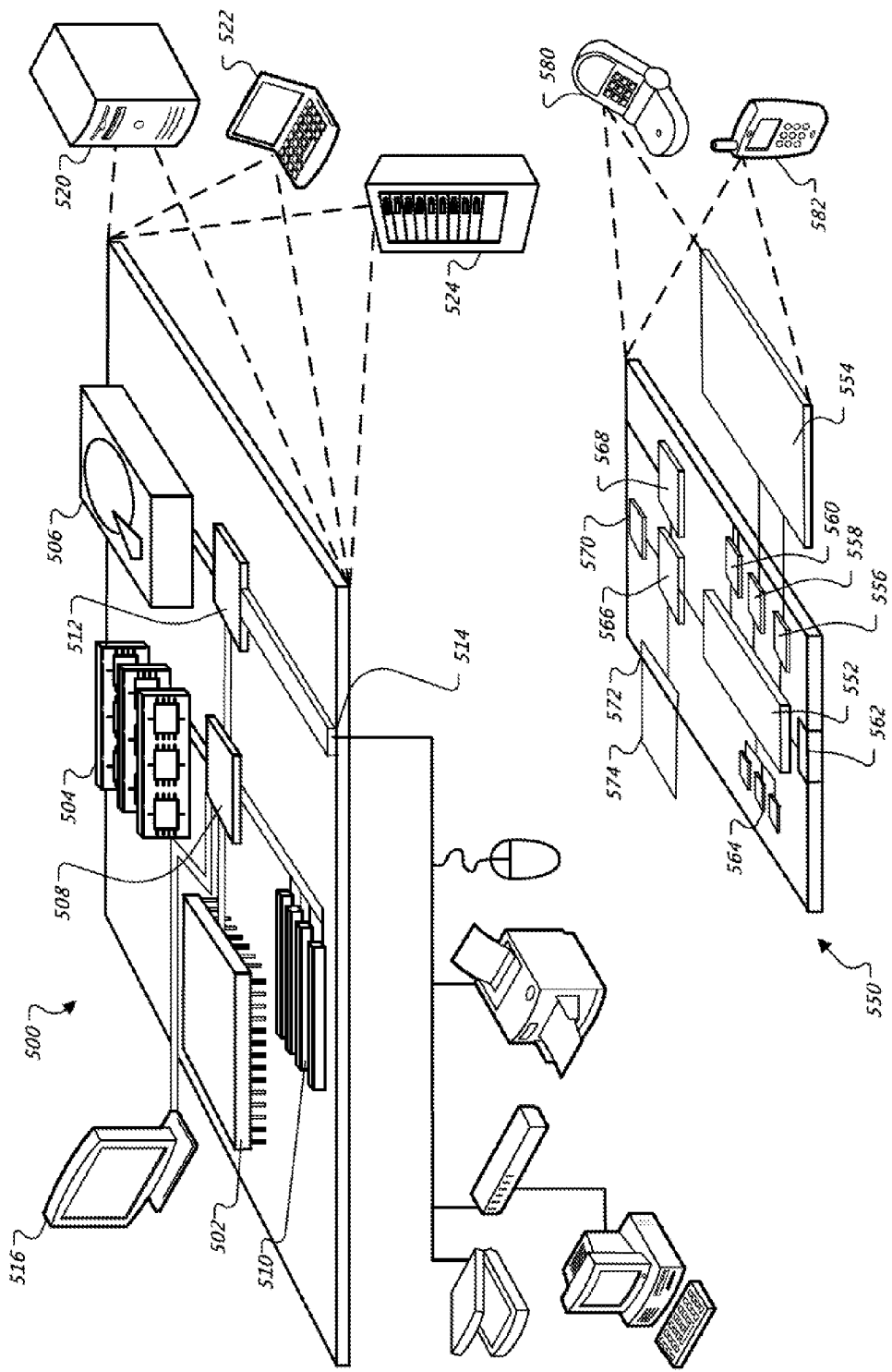
FIG. 5 is a block diagram of computing devices that may be used to implement the systems and methods described in this document, as either a client or as a server or plurality of servers.

FIG. 5 is a block diagram of computing devices 500, 550 that may be used to implement the systems and methods described in this document, as either a client or as a server or a plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method for providing access to secured resources, the method comprising:
   storing, by a token providing system at a computer, primary authentication token information that an authentication system of a service provider generated in response to receiving authentication credentials for a user account, wherein the primary authentication token information can be used to obtain multiple temporary authentication token information that can be used to access secured resources that the service provider stores in association with the user account, and wherein the token providing system does not have access to the authentication credentials;

receiving, by the token providing system and from a first application program of multiple application programs, a first request to obtain first temporary authentication token information for use in accessing a first portion of the secured resources, wherein the first application program does not have access to the authentication credentials and the first request does not include the primary authentication token information, wherein the first request includes a first requested scope that is for use in identifying the first portion of the secured resources;

transmitting, by the token providing system and to the authentication system, a second request to obtain the first temporary authentication token information, wherein the second request includes the primary authentication token information that was stored by the token providing system;

receiving, by the token providing system and from the authentication system, the first temporary authentication token information;

providing, by the token providing system and to the first application program, the first temporary authentication token information for use by the first application program in accessing the first portion of the secured resources;

receiving, by the token providing system and from a second application program of the application programs, a third request to obtain second temporary authentication token information for use in accessing a second portion of the secured resources, wherein the third request includes a second requested scope that is for use in identifying the second portion of the secured resources and does not include the primary authentication token information;

transmitting, by the token providing system and to the authentication system, a fourth request to obtain the second temporary authentication token information, the fourth request including the primary authentication token information and the second requested scope;

receiving, by the token providing system and from the authentication system, the second temporary authentication token information; and providing, by the token providing system and to the second application program, the second temporary authentication token information for use by the second application program in accessing the second portion of the secured resources, wherein the first portion of the secured resources is different than the second portion of the secured resources.

2. A computer-implemented method for providing access to secured resources, the method comprising:

storing, by a token providing system at a computer system, primary authentication token information that is used to obtain temporary authentication token information from an authentication system of a service provider, wherein the token providing system provides, to application programs that are unable to access the primary authentication token information, the temporary authentication token information for use in accessing portions of secured resources of the service provider;

receiving, by the token providing system and from a first application program of the application programs, a first request to obtain first temporary authentication token information for use in accessing a first portion of the secured resources, wherein the first request does not include the primary authentication token information, wherein the first request includes a first requested scope that is for use in identifying the first portion of the secured resources;

transmitting, by the token providing system and to the authentication system at the service provider, a second request to obtain the first temporary authentication token information, wherein the second request includes the primary authentication token information;

receiving, by the token providing system and from the authentication system, the first temporary authentication token information;

providing, by the token providing system and to the first application program, the first temporary authentication token information for use by the first application program in accessing the first portion of the secured resources;

receiving, by the token providing system and from a second application program of the application programs, a third request to obtain second temporary authentication token information for use in accessing a second portion of the secured resources, wherein the third request includes a second requested scope that is for use in identifying the second portion of the secured resources and does not include the primary authentication token information;

transmitting, by the token providing system and to the authentication system, a fourth request to obtain the second temporary authentication token information, the fourth request including the primary authentication token information and the second requested scope;

receiving, by the token providing system and from the authentication system, the second temporary authentication token information; and providing, by the token providing system and to the second application program, the second temporary authentication token information for use by the second application program in accessing the second portion of the secured resources, wherein the first portion of the secured resources is different than the second portion of the secured resources.

3. The method of claim 2, wherein the authentication system generated the primary authentication token information in response a user providing authentication credentials for a user account, wherein the primary authentication token information can be used to obtain secured resources of the service provider that are associated with the user account.

4. The method of claim 3, wherein the primary authentication token information cannot be used to access secured resources of the service provider that cannot be accessed using the authentication credentials.

5. The method of claim 3, wherein the authentication credentials include a username and a shared secret that are associated with the user account.

6. The method of claim 2, wherein the token providing system does not have access to authentication credentials that are associated with the primary authentication token information.

7. The method of claim 6, wherein:
the first application program does not have access to the authentication credentials, the authentication credentials are for a user account at the service provider, and the first temporary authentication token information is for use in accessing a portion of resources that are associated with the user account at the service provider.

8. The method of claim 2, wherein the second request includes the first requested scope.

9. The method of claim 8, wherein the first temporary authentication token information provides the first application program access, based on the first requested scope, to the first portion of the secured resources in distinction to other portions of the secured resources.

10. The method of claim 2, wherein the first temporary authentication token information can be used, for accessing the first portion of the secured resources, for a limited time duration.

11. The method of claim 10, wherein the limited time duration is shorter than a time duration during which the authentication system provides temporary authentication token information to the token providing system in response to the token providing system providing, to the authentication system, requests that include the primary authentication token information.

12. The method of claim 2, wherein the primary authentication token information cannot be used to retrieve secured resources from the service provider without obtaining one or more temporary authentication token information using the primary authentication token information.

13. A computer system for providing access to secured resources, the system comprising:
   one or more processors; and
   one or more computer-readable devices that store:
      application programs that are hosted by a computer system for third-party users that are provided an ability to administer the application programs upon providing valid user credentials;
      primary token information, at the computer system, that an authentication system of a service provider generated in response to the service provider receiving user credentials that are associated with a user account, the service provider storing resources in association with the user account; and
      a temporary token program, at the computer system, to:
         (i) receive, from a first application program of the application programs, a first request to obtain first temporary authentication token information for use in accessing a first portion of the stored resources, wherein the first request does not include the primary token information, wherein the first request includes a first requested scope that is used in identifying the first portion of the stored resources,
         (ii) transmit, to the authentication system, a second request to obtain the first temporary authentication token information, the second request including the primary token information,
         (iii) receive, from the authentication system, the first temporary authentication token information,
         (iv) provide, to the first application program, the first temporary authentication token information for use by the first application program in accessing the first portion of the stored resources,
         (v) receive, from a second application program of the application programs, a third request to obtain second temporary authentication token information for use in accessing a second portion of the stored resources, wherein the third request includes a second requested scope that is used in identifying the second portion of the stored resources,
         (vi) transmit, to the authentication system, a fourth request to obtain the second temporary authentication token information, the fourth request including the primary token information and the second requested scope,
         (vii) receive, from the authentication system, the second temporary authentication token information, and
         (viii) provide, to the second application program, the second temporary authentication token information for use by the second application program in accessing the second portion of the stored resources.

14. The computer system of claim 13, wherein a first subset of the application programs is stored by a first virtual machine that the computer system hosts for a first third-party user of the third-party users; and wherein a second subset of the application programs is stored by a second virtual machine that the computer system hosts for a second third-party user of the third-party users.

15. The computer system of claim 13, further comprising a scope authorizer, at the computer system, to determine whether the first requested scope and the second requested scope are valid for permissions provided to the first application program and second application program, respectively.

16. The computer system of claim 13, wherein the computer system does not store the user credentials.

17. The computer system of claim 13, wherein none of the application programs store the user credentials and none of the application programs store the primary token information.

18. The computer system of claim 13, further comprising the authentication system.

* * * * *